(12) United States Patent
Iezzi

(10) Patent No.: US 9,540,543 B2
(45) Date of Patent: Jan. 10, 2017

(54) EXTERIOR DURABLE SILOXANE-BASED NONSKID/NONSKIP COATING

(71) Applicant: Erick B. Iezzi, Alexandria, VA (US)

(72) Inventor: Erick B. Iezzi, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 14/691,615

(22) Filed: Apr. 21, 2015

(65) Prior Publication Data

US 2016/0312064 A1 Oct. 27, 2016

(51) Int. Cl.
*C09D 7/12* (2006.01)
*C09D 183/06* (2006.01)

(52) U.S. Cl.
CPC .......... *C09D 183/06* (2013.01); *C09D 7/1283* (2013.01)

(58) Field of Classification Search
None
See application file for complete search history.

(56) References Cited

U.S. PATENT DOCUMENTS

| | | |
|---|---|---|
| 4,008,294 A | 2/1977 | Marans et al. |
| 4,988,778 A | 1/1991 | Chang et al. |
| 5,804,616 A | 9/1998 | Mowrer et al. |
| 5,942,073 A * | 8/1999 | Mowrer .................. B32B 27/08 156/329 |
| 6,217,252 B1 | 4/2001 | Tolliver et al. |
| 6,268,440 B1 | 7/2001 | Kudo et al. |
| 9,006,307 B2 | 4/2015 | Iezzi et al. |
| 2005/0148752 A1 | 7/2005 | Klaassens et al. |
| 2009/0072199 A1 | 3/2009 | Lewarchik et al. |
| 2009/0226673 A1 | 9/2009 | Friedersdorf et al. |
| 2009/0234071 A1 | 9/2009 | Martz et al. |
| 2010/0028690 A1 | 2/2010 | Parks et al. |
| 2011/0224327 A1 | 9/2011 | Kardash et al. |
| 2012/0071582 A1 | 3/2012 | Iezzi et al. |
| 2012/0238666 A1 | 9/2012 | Iezzi et al. |
| 2013/0234070 A1* | 9/2013 | Mowrer .................. C08L 63/00 252/389.2 |

FOREIGN PATENT DOCUMENTS

WO  2014164202 A1  10/2014

OTHER PUBLICATIONS

Search Report and Written Opinion in PCT/US2016/017087 (May 23, 2016).
International Search Report and Written Opinion for Application No. PCT/US10/49740, dated Nov. 3, 2010.
3M Zeeospheres Product Information Sheet.
EGM 400 Structural Information from SciFinder.

* cited by examiner

*Primary Examiner* — Ana Woodward
(74) *Attorney, Agent, or Firm* — US Naval Research Laboratory; Joseph T. Grunkemeyer

(57) ABSTRACT

A nonskid/nonslip composition having: a mixture or a reaction product of an amino-functional polysiloxane and a non-aromatic epoxy, a polyamide polymer, and an abrasive aggregate.

16 Claims, 3 Drawing Sheets

R = A$_x$ or B$_{8-x}$

A =

B = aliphatic, cycloaliphatic, or aromatic hydrocarbon; dimethyl-, methylphenyl-, or diphenylpolysiloxane R' = aliphatic, cycloaliphatic, or aromatic hydrocarbon; ester-containing hydrocarbon

EXTERIOR DURABLE SILOXANE-BASED NONSKID/NONSKIP COATING

TECHNICAL FIELD

The present disclosure is generally related to a siloxane-based nonskid coating.

DESCRIPTION OF RELATED ART

Nonskid coatings utilized by the U.S. Navy are two-component (2K) systems composed of epoxy and amine resins, pigments, fillers, solvents and various sizes of aggregate to form a viscous system with a viscosity that is typically greater than 40,000 centipoise. Since their inception, these coatings have been applied to decks using a napless phenolic roller to generate a rough "peak and valley" profile, thereby providing a skid/slip-resistant surface once the coating is cured. The vast majority of Navy nonskid coatings are qualified as MIL-PRF-24667C, Type I (High Durability, Rollable Deck Coating) or Type V (Extended Durability, Rollable Deck Coating) coatings, which provide up to 12 or 36 months of service-life, respectively. The roll-application of nonskid is a slow and manual process, and appearance of the peak and valley profile has subtle variations over the deck. Inadequate profile and appearance, such as slumped peaks, can lead to reduced traction for maneuvering on decks under wet and dry conditions, whereas nonskids with thin, sharp peaks can injure sailors or potentially break-off and damage aircraft. Nonskid coatings that are roll-applied too thin on decks, or where coverage in the valleys is of insufficient film thickness, can also lead to the early onset of corrosion, thereby resulting in an unsightly appearance and premature replacement of the nonskid before the service-life is reached.

The spray-application of nonskid coatings have been proposed as a method for generating a homogenous surface (i.e., no peaks and valleys), thereby eliminating variations in rolled profiles and enhancing corrosion resistance due to the lack of thin film coverage in the valleys. However, the high viscosity of these epoxy/amine nonskids prevents many of them from being spray-applied with commercial pressure-pot equipment unless the size of aggregate is reduced and solvent is added to reduce the viscosity. Consequently, this reduction in aggregate size reduces the coefficient of friction of the cured surface.

Epoxy/amine-based nonskid coatings are typically composed of aromatic epoxy resins (e.g., Bisphenol A diglycidyl ether) and fatty acid based amidoamine resins. Due to their inherent chemistry, these nonskid coatings are not resistant to oxidation and ultraviolet (UV) radiation from sunlight, which is evident by their fading, discoloration, chalking, and loss of profile (i.e., wearing) within a few months after application. These traditional nonskid coatings also contain high levels of volatile organic compounds (VOCs), which can lead to solvent entrapment, shrinkage, and cracking as the coating cures. These issues result in many nonskid coatings being replaced before their stated service life is reached.

BRIEF SUMMARY

Disclosed herein is a composition comprising: a mixture or a reaction product of an amino-functional polysiloxane and a non-aromatic epoxy, a polyamide polymer, and an abrasive aggregate.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The disclosed nonskid coating is a two-component system, meaning that a pigmented base component and a hardener/activator component are mixed together to provide the cured coating. The composition can provide enhanced exterior durability, such as color and profile retention, compared to traditional epoxy/amine nonskid coatings. The compositions can be rolled or sprayed to generate cured surfaces with good slip-resistance.

Figure 1:
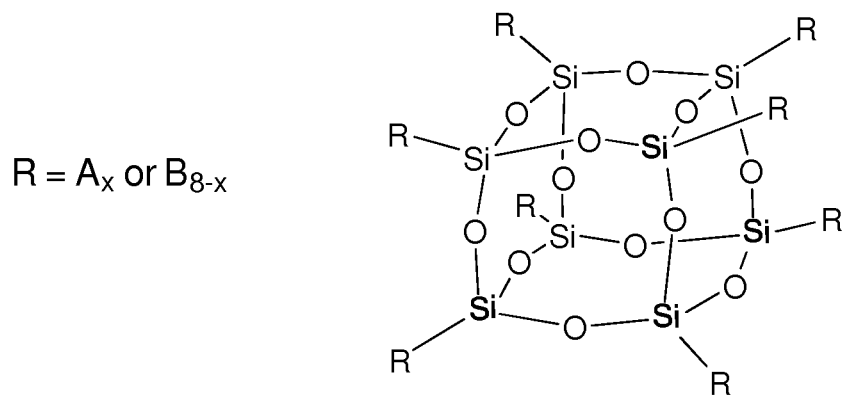
FIG. 1 shows a general structure for a silsesquioxane-based amino-functional polysiloxane.
Figure 1:
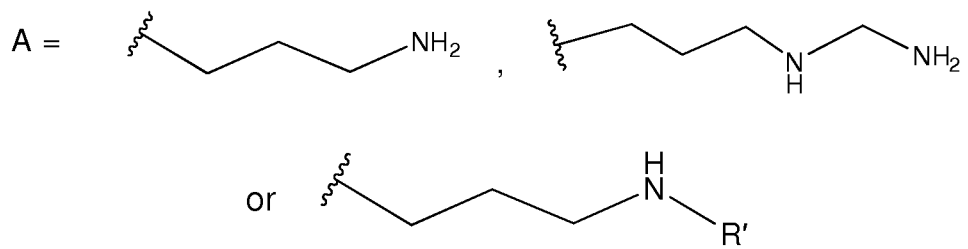

The amino-functional polysiloxane can be any polysiloxane that contains an amino group, including two or more amino groups. As used herein, polysiloxanes include silsesquioxanes, which are organosilicon compounds with the empirical chemical formula $RSiO_{3/2}$ where R is either hydrogen or an alkyl, alkene, aryl, or arylene group. The amino-functional polysiloxane can be an amino-functional silsesquioxane with primary and/or secondary amine containing appendages on a silsesquioxane cage with aliphatic, cycloaliphatic, or aromatic hydrocarbon and/or dimethyl-, methylphenyl-, or diphenylpolysiloxane as the remainder of the groups on the cage as shown in FIG. 1. The silsesquioxane cage may be fully or partially condensed. The amino-functional polysiloxane/silsesquioxane can also be generated in-situ during mixing of components via hydrolysis and condensation of aminopropyltrialkoxysilanes, N-alkyl-aminopropyltrialkoxysilanes or N-aryl-aminopropyltrialkoxysilanes. One example silsesquioxane is the closed cubic cage $R_8Si_8$—$O_{12}$. The amino-functional polysiloxane can also be a linear or branched methylphenyl- or diphenylpolysiloxane polymer with amino-functional groups and a viscosity of >3000 mPa·s. Examples of amino-functional polysiloxanes include, but are not limited to, poly[(2-aminoethyl)aminopropyl]methoxy(dimethyl)siloxane, polymers with [(2aminoethyl)aminopropyl]phenylsilsesquioxane, OH-terminated (commercially available from Wacker Chemical as Silres® HP2000); 1,3-(3-aminopropyl)-5,7,9,11,13,15-heptaisobutylsilsesquioxane; 1,11-(3-aminopropyl)-3,5,7,9,13,15-hexaphenylsilsesquioxane; 1,5-(3-aminopropyl)-3,7,9,11,13,15-heptamethylsilsesquioxane; 1,11-(N-methyl-3aminopropyl)-3,5,7,9,13,15-hexaisobutylsilsesquioxane; and silsesquioxanes formed in-situ from 3-aminopropyltrimethoxysilane.

Figure 2:
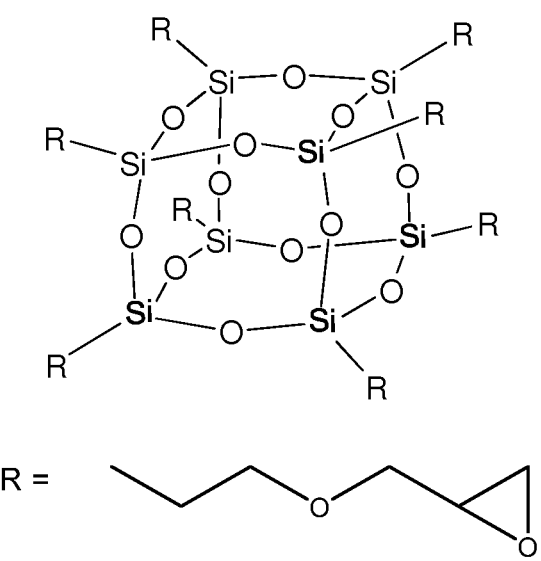
FIG. 2 shows a structure for an example epoxy-functional silsesquioxane.

The non-aromatic epoxy resin can be any compound containing an epoxy group, including two or more epoxy groups, that lacks aromatic groups, and may be an aliphatic or cycloaliphatic hydrocarbon, an epoxy-functional ester, an epoxy-functional acrylic, an epoxy-functional urea, an epoxy-functional urethane, an epoxy-functional carbonate, an epoxy-functional fluorinated aliphatic, an epoxy-functional dimethyl-, methylphenyl or diphenylpolysiloxane, or an epoxy-functional silsesquioxane. Examples include, but are not limited to, hydrogenated diglycidyl ether of Bisphenol A (commercially available as Eponex™ 1510 from Momentive), hydrogenated diglycidyl ether of Bisphenol F, diglycidyl ether of 1,4-cyclohexane dimethanol, diglycidyl ether of neopentyl glycol, diglycidyl 1,2-cyclohexanedicarboxylate, diglycidyl ether of 1,4-butanediol, tris(2,3-epoxypropyl) isocyanurate, dimer acid diglycidyl ester (commercially available as Heloxy™ Modifier 71 from Momentive), D-sorbitol diglycidyl ether, D-sorbitol hexaglycidyl ether, trimethylol propane triglycidyl ether, polyglycidyl ether cyclosiloxane monomer (commercially available as CS-697 from Designer Molecules), glycidyl ether functional dimethyl-, dimethylphenyl-, or diphenylphenyl polysiloxanes, and epoxy-functional silsesquioxanes. An example epoxy-functional silsesquioxane is shown in FIG. 2.

The polyamide polymer may be used to provide flexibility or thixotropic properties, and can be any polymer containing an amide group, including in the polymer backbone, and can be an aliphatic, cycloaliphatic or aromatic polyamide. Examples include, but are not limited to, fatty-acid based polyamides, dimerized fatty-acid based polyamides, paraphenylene terephthalamides, nylons, polyaspartates, and poly(hexamethylene adipamide).

The abrasive aggregate can be any particle that is incorporated into the composition that increases the coefficient of friction of the surface of the composition once the composition has solidified. It may a be rounded or angular wear-resistant particle consisting of 0.25-2.5 mm in size and 3-9 Mohs hardness. Examples include, but are not limited to, brown aluminum oxide, white aluminum oxide, walnut shells, aluminum, crushed glass, glass beads, corn cob, melamine, acrylic, and urea.

The alkoxysilane- or hydroxyl-functional material can be any compound having an alkoxysilane group or a hydroxyl group, and may be a different compound from any of the amino-functional polysiloxane, the non-aromatic epoxy resin, and the polyamide polymer, and may be aliphatic, cycloaliphatic, ester-based, and/or polysiloxane-based. Examples include, but are not limited to, tetraethyl orthosilicate, methoxy-functional dimethylpolysiloxane, methoxy-functional methylphenylpolysiloxane, hydroxyl-functional dimethylpolysiloxane, 1,6-hexanediol, trimethylol propane, 1,4-cyclohexanedimethanol, hydroxyl-functional polyesters, hydroxyl-functional acrylics, and hydroxyl-functional urethanes.

The filler may be a different type of particle than the abrasive aggregate, and can be an amorphous, plate-like, rod-like, fiber-like, or spherical particle. Examples include, but are not limited to, amorphous silica, alkali alumino silicate ceramic, glass beads, talc, mica, wollastonite, calcium carbonate, polypropylene powder, acrylic beads, rubber beads, polyurethane beads, polymethyl urea powder, polyethylene fibers, and graphite. The spherical fillers can be used to reduce the viscosity and solvent requirements of the nonskid/nonslip composition, whereas the other fillers can be used to increase the viscosity.

The pigments in the nonskid/nonslip composition are used to provide color and hiding of a substrate. Examples include, but are not limited to, carbon black, titanium dioxide, cobalt blue, copper phthalocyanine blue, sodium aluminum sulphosilicate, chromium green black hematite, yellow iron oxide, carbazole violet, and azomethine black.

The solvents in the nonskid coating composition are used to provide viscosity reduction and as a vehicle for applying the coating. These solvents evaporate after the mixed coating is applied. Examples include, but are not limited to, Oxsol® 100, methyl amyl ketone, pentyl propionate, butyl propionate, aromatic 100, xylene, toluene, tert-butyl acetate, and dimethyl carbonate.

The catalyst in the nonskid coating composition is used to accelerate the curing/crosslinking of the system. Examples include, but are not limited to, dibutyltin dilaurate, dibutyltin diacetate, tetraalkyl titanates, titanate chelates, and zirconates.

Any of these components and their methods of use may also be those disclosed in U.S. Pat. No. 9,006,307 and US Pat. Appl. Pub. No. 2012/0238666. All publications and patent documents referred to throughout this nonprovisional application are incorporated herein by reference.

A coating may be made from these reactants by a two-component method. The amino-functional polysiloxane may be in one component and the non-aromatic epoxy in the other. When the two components are combined, the amino-functional polysiloxane and the non-aromatic epoxy copolymerize to form a cured material. The viscosity when combined may be at least 10,000 cPs, which may be immediately upon mixing or after some reaction has occurred. A reaction scheme for bifunctional components is shown below. There is no required minimum molecular weight. In general, any amounts of the reactants may be used that results in a solid coating. For example, equivalent molar amounts of amine and epoxy groups may be used, or up to 10% molar excess of the amine or epoxy groups may be used.

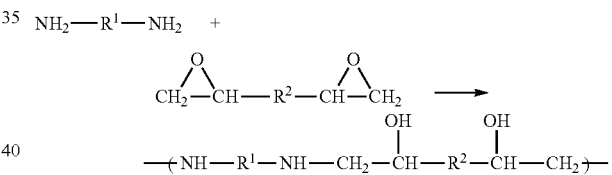

When the composition is rolled onto a surface it may have a peak and valley profile. Typically, the peak height is 2-5 centimeters. However, it is understood by one skilled in the art that the peak height of the rolled nonskid can vary depending on the viscosity of the nonskid, the type, quantity and size of abrasive aggregate, and the force applied by the applicator during the roll application.

The following examples are given to illustrate specific applications. These specific examples are not intended to limit the scope of the disclosure in this application.

EXAMPLE 1

Figure 3:
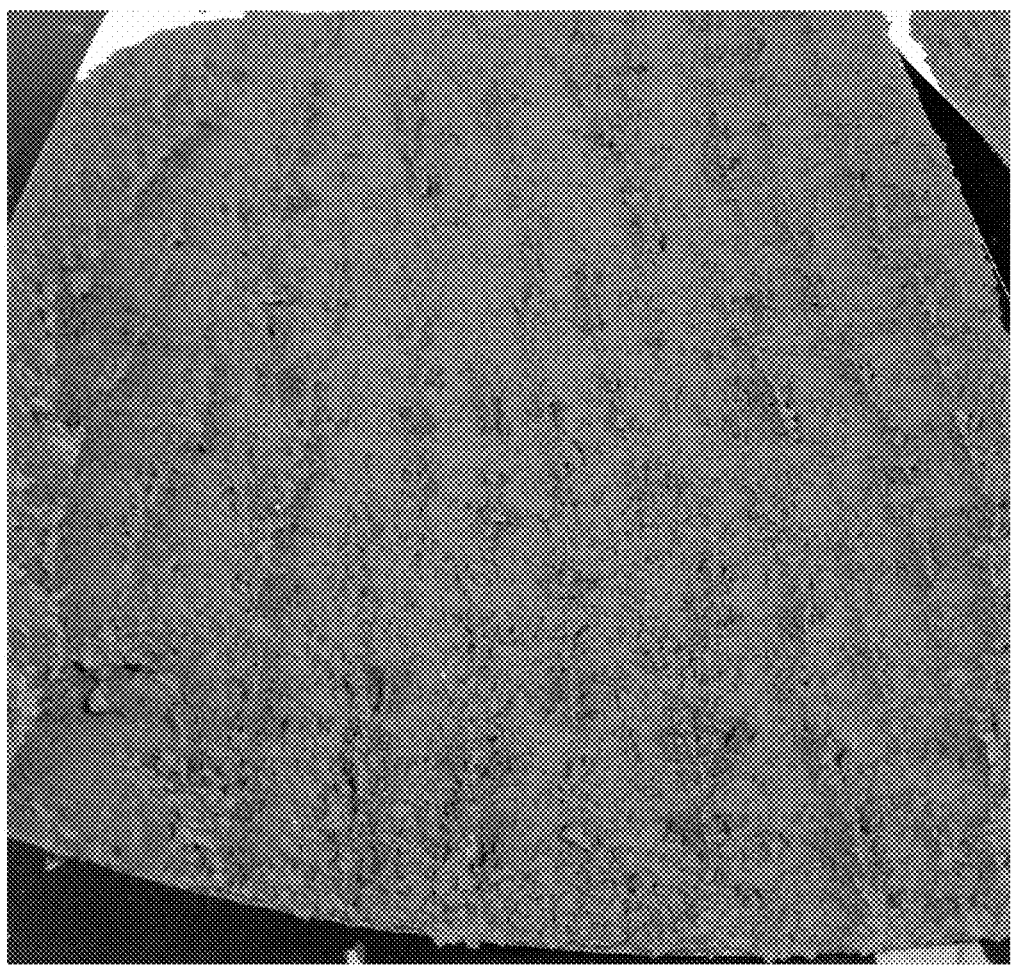
FIG. 3 is a photograph of a non-skid coating of the disclosed composition.

The example in Table 1 describes a nonskid coating based on a mixture of an amino-functional polysiloxane resin, a cycloaliphatic epoxy, an epoxy-functional polysiloxane, a polyamide polymer, and an abrasive aggregate. The first component contains the amino-functional polysiloxane (commercially available as Silres® HP2000 from Wacker Chemical) and tin-based catalyst, whereas the second component contains the cycloaliphatic epoxy (commercially available as Eponex™ 1510 from Momentive), epoxy-functional dimethylphenylpolysiloxane (commercially available as Silres® HP1250 from Wacker Chemical), polyamide polymer (commercially available as Crayvallac® PA4BA20 from Arkema), an abrasive aggregate (commercially available as acrylic plastic abrasive from Kramer Industries), colorizing pigments, fillers (commercially available as W-610 microspheres from 3M and Pergopak® M3 from Albermarle), and solvent. The components were mixed together in a 6:1 ratio (by volume), and can be either roll- or spray-applied over an epoxy primer. FIG. 3 is a photo of the rolled nonskid coating from Table 1 where the peaks and valleys are visible in the surface.

TABLE 1

| | Wt. % of Formula |
|---|---|
| First Component (hardener) | |
| Silres ® HP2000 | 12.97% |
| Dibutyltin dilaurate | 0.085% |
| Second Component (base) | |
| Eponex ™ 1510 | 9.23% |
| Silres ® HP1250 | 7.31 |
| Titanium dioxide | 0.28% |
| Ferro V-12650 | 3.11% |
| Carbon black | 0.085% |
| Yellow iron oxide | 0.85% |
| Pergopak ® M3 | 5.66% |
| Methyl amyl ketone | 14.34% |
| W-610 Microspheres | 17.76% |
| Crayvallac ® PA4BA20 | 7.08% |
| Acrylic plastic abrasive | 21.24% |

EXAMPLE 2

The example in Table 2 describes a nonskid coating based on a mixture of an amino-functional polysiloxane resin, a cycloaliphatic epoxy, a polyamide polymer, an abrasive aggregate, and an alkoxy-functional polysiloxane. The first component contains the amino-functional polysiloxane (commercially available as Silres® HP2000 from Wacker Chemical) and tin-based catalyst, whereas the second component contains the cycloaliphatic epoxy (commercially available as Eponex™ 1510 from Momentive), polyamide polymer (commercially available as Crayvallac® PA4BA20 from Arkema), methoxy-functional polysiloxane (commercially available as Silres® SY231 from Wacker Chemical), an abrasive aggregate (commercially available as brown aluminum oxide grit from Kramer Industries), colorizing pigments, fillers (commercially available as W-610 microspheres from 3M and Syloid® C 812 silica from Grace), and solvent. The components were mixed together in a 5:1 ratio (by volume), and can be either roll- or spray-applied over an epoxy primer.

TABLE 2

| | Wt. % of Formula |
|---|---|
| First Component (hardener) | |
| Silres ® HP2000 | 9.76% |
| Dibutyltin dilaurate | 0.052% |
| Second Component (base) | |
| Eponex ™ 1510 | 8.70% |
| Titanium dioxide | 0.17% |
| Ferro V-12650 | 1.93% |
| Carbon black | 0.052% |
| Yellow iron oxide | 0.52% |
| W-610 microspheres | 7.35% |
| Syloid ® C 812 | 5.26% |
| Oxsol ® 100 | 14.43% |

TABLE 2-continued

| | Wt. % of Formula |
|---|---|
| Silres ® SY231 | 3.51% |
| Crayvallac ® PA4BA20 | 4.39% |
| Brown aluminum oxide | 43.88% |

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
    a mixture or a reaction product of:
        an amino-functional polysiloxane; and
        a non-aromatic epoxy;
    a polyamide; and
    an abrasive aggregate;
        wherein the abrasive aggregate is a plurality of particles having an average diameter of 0.25-2.5 mm; and
        wherein the abrasive aggregate has an average hardness of 3-9 Mohs.

2. The composition of claim 1, wherein the amino-functional polysiloxane is an amino-functional silsesquioxane.

3. The composition of claim 1, wherein the amino-functional polysiloxane is a mixture of an amino-functional silsesquioxane and a linear or branched amino-functional dimethyl-, diphenyl-, or methylphenylpolysiloxane.

4. The composition of claim 1, wherein the non-aromatic epoxy is an aliphatic or cycloaliphatic epoxy resin, an epoxy-functional ester, epoxy-functional acrylic, epoxy-functional urea, epoxy-functional urethane, epoxy-functional silsesquioxane, or an epoxy-functional polysiloxane resin.

5. The composition of claim 1, wherein the polyamide contains aliphatic groups, aromatic groups, or both.

6. The composition of claim 1, wherein the particles are rounded or angular particles.

7. The composition of claim 1, further comprising:
    an alkoxysilane-functional material.

8. The composition of claim 7, wherein the alkoxysilane-functional material is a linear or branched polysiloxane with hydrolyzable alkoxy groups.

9. The composition of claim 1, further comprising:
    a hydroxyl-functional material.

10. The composition of claim 9;
    wherein the hydroxyl-functional material is linear or branched; and
    wherein the hydroxyl-functional material is aliphatic, cycloaliphatic, ester-based, polysiloxane-based, or a combination thereof.

11. The composition of claim 1, further comprising:
    a filler.

12. The composition of claim 11, wherein the filler is an amorphous, plate-shaped, rod-shaped, fiber-shaped, or spherical filler.

13. The composition of claim 12, wherein the spherical filler reduces the viscosity of the composition.

14. The composition of claim 1, further comprising:
    a solvent, a pigment, or a catalyst.

15. The composition of claim 1, wherein the viscosity of the composition is at least 10,000 centipoise at room temperature.

16. A method comprising:
   rolling or spraying the composition of claim 15 onto a surface.

* * * * *